US011610285B2

(12) United States Patent
Qin

(10) Patent No.: US 11,610,285 B2
(45) Date of Patent: Mar. 21, 2023

(54) DISPLAY METHOD AND DEVICE

(71) Applicant: Lenovo (Beijing) Limited, Beijing (CN)

(72) Inventor: Huijun Qin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/467,169

(22) Filed: Sep. 3, 2021

(65) Prior Publication Data

US 2022/0101495 A1  Mar. 31, 2022

(30) Foreign Application Priority Data

Sep. 30, 2020  (CN) .......................... 202011063758.1

(51) Int. Cl.
*G06T 3/60* (2006.01)
*G06F 3/0487* (2013.01)
*G06F 3/14* (2006.01)
*G06T 3/40* (2006.01)
*G06T 11/40* (2006.01)
*G06T 11/60* (2006.01)
*H04M 1/72409* (2021.01)

(52) U.S. Cl.
CPC .............. *G06T 3/60* (2013.01); *G06F 3/0487* (2013.01); *G06F 3/1423* (2013.01); *G06T 3/40* (2013.01); *G06T 11/40* (2013.01); *G06T 11/60* (2013.01); *H04M 1/72409* (2021.01)

(58) Field of Classification Search
CPC ........... G06T 3/60; G06T 3/0487; G06T 3/40; G06T 11/40; G06T 11/60
See application file for complete search history.

(56) References Cited

U.S. PATENT DOCUMENTS

2015/0161767 A1\* 6/2015 Monden .................... G06T 3/60
 345/428
2017/0097691 A1\* 4/2017 Furukawa ............. G06F 1/1694
2020/0380935 A1\* 12/2020 Ignaszewski ......... G06F 1/1622

FOREIGN PATENT DOCUMENTS

CN  104581405 A  4/2015
CN  107423010 A  12/2017

\* cited by examiner

*Primary Examiner* — Michelle L Sams
(74) *Attorney, Agent, or Firm* — Anova Law Group, PLLC

(57) ABSTRACT

A display method includes obtaining a first display signal from a data apparatus connected to a display apparatus, processing the first display signal in a first method to obtain a first image set and outputting the first image set, detecting attitude information indicating an attitude, and in response to the attitude information indicating the attitude of the display apparatus satisfying a change condition, processing a second display signal from the data apparatus to obtain a second image set and outputting the second image set. The first method is different from the second method. Content display attribute information of the first image set is different from content display attribute information of the second image set.

13 Claims, 14 Drawing Sheets

DISPLAY METHOD AND DEVICE

CROSS-REFERENCE TO RELATED APPLICATION

This application claims priority to Chinese Patent Application No. 202011063758.1, filed on Sep. 30, 2020, the entire content of which is incorporated herein by reference.

TECHNICAL FIELD

The present disclosure generally relates to the image processing technology field and, more particularly, to a display method and device.

BACKGROUND

With the rapid development of science and technology, data may be displayed in various formats. For example, most smart terminals include an office mode. When a smart terminal is connected to a monitor, remote working is realized.

When a smart terminal is connected to a monitor, and when the attitude of the monitor changes, such as when the attitude of the monitor is adjusted from a landscape attitude to a portrait attitude, a content displayed by the monitor cannot be adaptively adjusted from a landscape display mode to a display mode suitable for the portrait attitude. Thus, user experience is greatly impaired.

SUMMARY

Embodiments of the present disclosure provide a display method. The method includes obtaining a first display signal from a data apparatus connected to a display apparatus, processing the first display signal in a first method to obtain a first image set and outputting the first image set, detecting attitude information indicating an attitude, and in response to the attitude information indicating the attitude of the display apparatus satisfying a change condition, processing a second display signal from the data apparatus to obtain a second image set and outputting the second image set. The first method is different from the second method. Content display attribute information of the first image set is different from content display attribute information of the second image set.

Embodiments of the present disclosure provide a display apparatus including an interface device, a display device, a detector, and a processor. The interface device is configured to obtain a display signal from a data apparatus connected to the display apparatus. The display device is configured to output an image set corresponding to the display signal. The detector is configured to detect attitude information indicating an attitude. The processor is configured to process a first display signal in a first method to obtain a first image set, and in response to the attitude information indicating the attitude of the display apparatus satisfying a change condition, process a second display signal to obtain a second image set. The first method is different from the second method. Content display attribute information of the first image set is different from content display attribute information of the second image set.

Embodiments of the present disclosure provide a computer-readable storage medium. The computer-readable storage medium stores a computer program that, when executed by a processor, causes the processor to obtain a first display signal from a data apparatus connected to a display apparatus, process the first display signal in a first method to obtain a first image set and output the first image set, detect attitude information indicating an attitude, and in response to the attitude information indicating the attitude of the display apparatus satisfying a change condition, process a second display signal from the data apparatus to obtain a second image set and outputting the second image set. The first method is different from the second method. Content display attribute information of the first image set is different from content display attribute information of the second image set.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

To make the purposes, technical solutions, and advantages of the present disclosure clearer, the present disclosure is further described in detail below in connection with the accompanying drawings. Described embodiments do not limit the present disclosure. All other embodiments obtained by those of ordinary skill in the art without creative efforts are within the scope of the present disclosure.

In the following description, "some embodiments" describe a subset of all possible embodiments. "some embodiments" may include the same subset or different subsets of all possible embodiments, and may be combined with each other without conflict.

The terms "first\second\third" in embodiments of the present disclosure are merely used to distinguish similar objects, and do not represent a specific order for the objects. "first\second\third" may be interchanged in specific order or sequence when permitted. The objects distinguished by "first\second\third" may be interchangeable under appropriate situations. Thus, embodiments of the present disclosure described here may be implemented in a sequence other than those illustrated or described here.

Unless otherwise defined, all technical and scientific terms used in the specification have the same meaning as commonly understood by those skilled in the art of the present disclosure. The terminology used here is only for the purpose of describing embodiments of the present disclosure, and is not intended to limit the present disclosure.

To better understand embodiments of the present disclosure, disadvantages in the related technology may be described first.

In the related technology, connecting a computer and a cellphone with a monitor for expanding screen display is more and more popular with users. Especially, most cell phones have their own office modes, and a connection of a portable monitor has a huge potential application in a mobile office, which may replace a part of computers for working.

An application of the monitor in a portrait mode may be applied in many user scenes, such as applications of software tools, e.g., word and onenote on the computer, and enlargement of a vertical screen of the cellphone.

Figure 1:
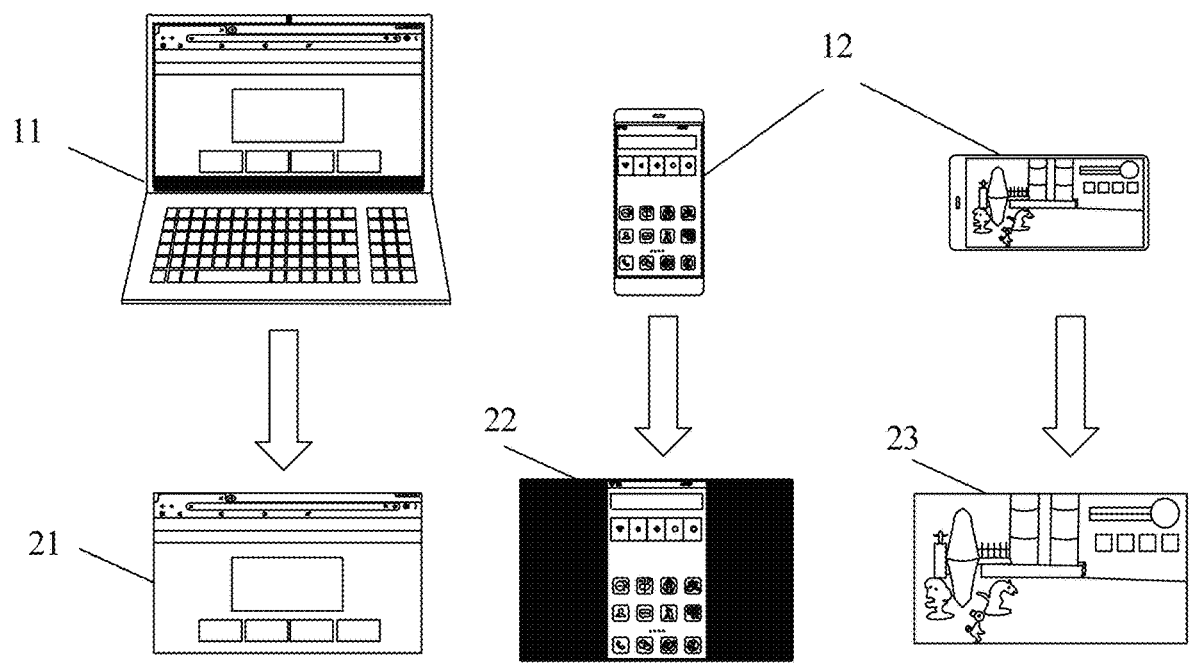
FIG. 1 illustrates a schematic diagram of output pictures of transmission signals transmitted by different data apparatuses according to some embodiments of the present disclosure.

Different data apparatuses such as the computer and the cellphone may have different output screens. An output screen here may not include a screen displayed on a display screen of a data apparatus. The output screen may include an image corresponding to display data in a transmission signal transmitted to the monitor. In the transmission signal transmitted from the computer and the cellphone to the monitor, the output screen of the computer may not include a black edge. However, when a cellphone is applied in a portrait mode, the output screen of the cellphone may include a large black edge. FIG. 1 illustrates a schematic diagram of output pictures of transmission signals transmitted by different data apparatuses according to some embodiments of the present disclosure. As shown in FIG. 1, the data apparatus includes a computer 11 or a cellphone 12. The output screen in the transmission signal of the computer 11 includes a screen 21. When the cellphone 12 is applied in the portrait mode, the output screen in the transmission signal includes a screen 22. When the cellphone 12 is applied in the landscape mode, the output screen in the transmission signal includes a screen 23. As shown in FIG. 1, output screens of different data apparatuses are different, especially the screen 22 output when the cellphone 12 is in a portrait mode. After the screen 22 is projected on the monitor, problems such as large black edges may appear on both sides of the screen 22, which greatly affect the user experience. For example, a ratio of a width to a height of the cellphone screen may be 9:18, and a ratio of a width to a height of the screen of the monitor may be 16:9. When the screen 22 is projected on the monitor, an effective screen may only be displayed in about ⅓ of the area in the middle of the monitor. Thus, the display area of the display screen may be greatly wasted. The projection of the screen of the cellphone may not be enlarged.

In the related technology, no monitor may adapt to the rotation of the screens of the computer and the cellphone. If a monitor with a screen that can be rotated is needed, a driver may need to be installed in the data apparatus, which leads to inconvenience for the user.

Figure 2:
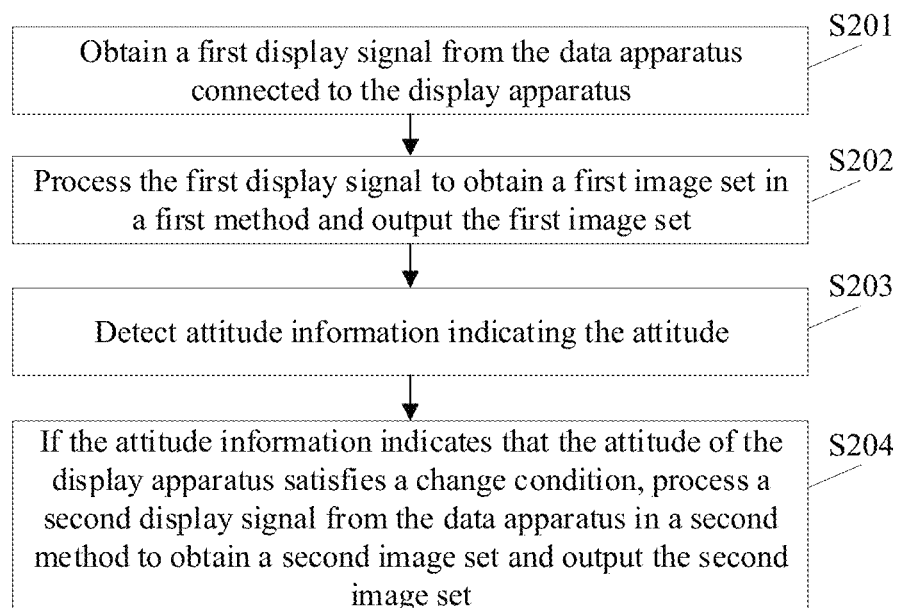
FIG. 2 illustrates a schematic flowchart of a display method according to some embodiments of the present disclosure.

Based on the problems in the related art, embodiments of the present disclosure provide a display method. The method may be applied to a display apparatus. The method provided by embodiments of the present disclosure may be implemented by a computer program. When the computer program is executed, steps of the display method of embodiments of the present disclosure may be completed. In some embodiments, the computer program may be executed by a processor in the display apparatus. FIG. 2 illustrates a schematic flowchart of a display method according to some embodiments of the present disclosure. As shown in FIG. 2, the method includes the following steps.

At S201, the display apparatus obtains a first display signal from the data apparatus connected to the display apparatus.

In some embodiments, the display apparatus may include a monitor that supports rotation. The data apparatus may include a terminal that outputs a display signal, including a mobile terminal such as a cellphone, a tablet, and a laptop, and a fixed terminal such as a digital television (TV), and a desktop.

A connection may be established between the display apparatus and the data apparatus. The connection may be established through a wireless network connection, such as Bluetooth, Wireless Fidelity (WiFi), etc., or a wireless connection, e.g., through an interface such as a video graphics array (VGA), a high-definition multimedia interface (HDMI), a universal serial bus (USB), and a transmission wire to realize a wired network connection.

After the display apparatus is connected to the data apparatus, the data apparatus may transmit data that needs to be displayed on the display apparatus to the display apparatus through the first display signal. The display apparatus may output an image according to the first display signal. When the display apparatus is in a duplication mode, the image output by the display apparatus may include a duplicated screen of the data apparatus. When the display apparatus is in an extension mode, the image output by the display apparatus may include an extended screen of the output image of the data apparatus. The images output by the display apparatus and the data apparatus may be same or different.

At S202, the display apparatus processes the first display signal to obtain a first image set in a first method and outputs the first image set.

After receiving the first display signal, the display apparatus may process the first display signal in the first method that is suitable for the current attitude of the display apparatus. The first display signal may include at least a unit display signal. The display data of the unit display signal may include the data of a same image. The display apparatus may process the display data of unit display signals included in the first display signal in a first method to obtain first images corresponding to the unit display signals to obtain the first image set. Then, according to a transmission order of the first images, the display apparatus may output the first images to realize the duplication or extension of the display image of the data apparatus.

At S203, the display apparatus detects attitude information indicating the attitude.

In some embodiments, the display apparatus may support a rotation function. The display apparatus may detect the attitude information indicating the attitude. The display apparatus may determine whether the attitude of the display apparatus changes according to the detected attitude information.

In some embodiments, the display apparatus may use an angle rotation sensor to detect the attitude information. The angle rotation sensor may be installed on a side or any corner of the screen of the display apparatus, or may be installed on an inner side of the display apparatus. The angle rotation sensor may sense a rotation angle of the screen, that is, the rotation angle of the display apparatus. In some embodiments, the angle rotation sensor may include at least one of a gravity sensor or an angle sensor.

At S204, if the attitude information indicates that the attitude of the display apparatus satisfies a change condition, the display apparatus processes a second display signal from the data apparatus in a second method to obtain a second image set and outputs the second image set.

The first method may be different from the second method, or content display attribute information of the first image set and the second image set may be different. The content display attribute information may include an image resolution.

After detecting the attitude information, the display apparatus may determine whether the attitude of the display apparatus changes. If the angle rotation sensor senses a change in the angle, it indicates that the attitude changes. The display apparatus may further determine whether the attitude information of the display apparatus satisfies the change condition. If the attitude information satisfies the change condition, the image displayed by the display apparatus may be adjusted based on the changed attitude information.

In some embodiments, when the angle rotation sensor senses that the display apparatus rotates for a determined angle, the display apparatus may determine that the attitude information satisfies the change condition. The determined angle may be a fixed value, e.g., 90°, 180°, and 270°, a range, e.g., 85°-95°, 175°-185°, and 265°-275°, or another predetermined value.

In some embodiments, the angle rotation sensor may sense a reference for the angle rotation. The display apparatus may rotate by using the current angle or a default angle, that is 0°, as the reference. Unless otherwise specified below, the rotation angle may refer to an angle of a clockwise rotation.

When the rotation angle is based on the default angle, if the display apparatus processes the first display signal in the first method to obtain the first image set before being rotated, the angle of the display apparatus may be 0°. When the display apparatus is detected to be rotated by 180°, the rotation angle of the display apparatus may be 180°, and the second method may be a corresponding method when the display apparatus is rotated by 180°. Suppose the display apparatus is detected to be rotated by 90° again. In that case, the rotation angle of the display apparatus may be 270°, and the second method may be a corresponding method method when the display apparatus is rotated by 270°. If the display apparatus is detected to be rotated by 90° again, the rotation angle of the display apparatus may be 360°. That is, the display apparatus returns to the initial angle of 0°. The second method may be the corresponding method when the display apparatus is at 0°, that is, the first method. In this case, the second method always processes the second display signal in a processing method corresponding to the rotation angle relative to the default angle.

When the rotation angle is based on the current angle, if the angle before the display apparatus is rotated is 90°, the display apparatus may process the first display signal in a processing method corresponding to 90°. When the display apparatus is detected to be rotated by 180°, although the rotation angle of the display apparatus is 270°, but the second method is the processing method corresponding to the current rotation angle, that is 180°. When the display apparatus is detected to be rotated by 90° again, although the rotation angle of the display apparatus is 360°, that is, the display apparatus returns to the initial angle of 0°, but the second method may be the processing method corresponding to the angle that is currently rotated, that is 90°. Thus, in this case, in the second method, the display apparatus always processes the second display signal in a processing method corresponding to the angle that is currently rotated.

The data apparatus cannot transmit different display information according to different attitudes of the display apparatus. That is, the content display attribute information of the first display signal output by the data apparatus before the attitude changes may be same as the content display attribute information of the second display signal output by the data apparatus after the attitude changes. The first method of processing the first display signal by the display apparatus may be different from the second method of processing the second display signal by the display apparatus to obtain different images. Thus, the image output by the display apparatus may be adjusted adaptively according to the change of the attitude. In some embodiments, the content display attribute information of the first image output by the display apparatus before the attitude of the display apparatus changes may be different from the content display attribute information of the second image output by the display apparatus after the attitude of the display apparatus change may be the same or different.

The data apparatus can transmit different display signals according to the different attitudes of the display apparatus. That is, the content display attribute information of the first display signal output by the data apparatus before the attitude changes may be different from the content display attribute information of the second display signal output by the data apparatus after the attitude changes. The first method in which the display apparatus processes the first display signal may be same as or different from the second method in which the display apparatus processes the second display signal. Even though the first method and the second method are the same, the content display attribute information of the first image output by the display apparatus before the attitude of the display apparatus changes may be different from the content display attribute information of the second image output after the attitude changes. Thus, the image output by the display apparatus may be adjusted adaptively according to the change of attitude.

In the display method of embodiments of the present disclosure, the display apparatus may be configured to process the first display signal from the data apparatus in the first method to obtain and output the first image set. The display apparatus may be further configured to detect the attitude information indicating the attitude. If the attitude of the display apparatus changes, the display apparatus may detect that the attitude information satisfies the change condition. Thus, the display apparatus may be configured to process the second display signal from the data apparatus in the second method to obtain and output the second image set. The first method may be different from the second method, or the content display attribute information of the first image set and the second image set may be different. As such, when the attitude changes, the display apparatus may adaptively adjust the image to a display mode that adapts to its own attitude.

Figure 3:
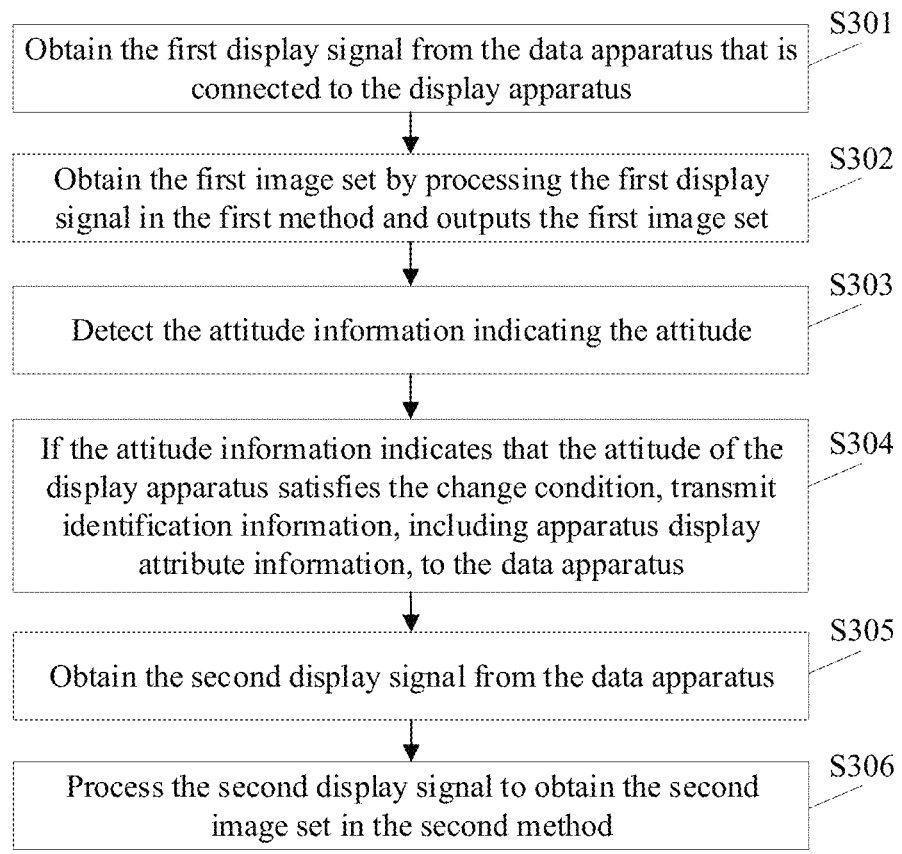
FIG. 3 illustrates a schematic flowchart of a display method according to some other embodiments of the present disclosure.

Based on embodiments shown in FIG. 2, embodiments of the present disclosure provide a display method. FIG. 3 illustrates a schematic flowchart of the display method according to some other embodiments of the present disclosure. As shown in FIG. 3, the method includes the following steps.

At S301, the display apparatus obtains the first display signal from the data apparatus that is connected to the display apparatus.

At S302, the display apparatus obtains the first image set by processing the first display signal in the first method and outputs the first image set.

At 303, the display apparatus is configured to detect the attitude information indicating the attitude.

Steps S301 to S303 of embodiments of the present disclosure correspond to steps S201 to S203 of embodiments shown in FIG. 2. For the implementation and effects of steps S301 to S303, reference may be made to the description of step S201 to S203 of embodiments shown in FIG. 2.

At S304, if the attitude information indicates that the attitude of the display apparatus satisfies the change condition, the display apparatus transmits identification information, including apparatus display attribute information, to the data apparatus.

After detecting the attitude information, the display apparatus may determine whether the attitude of the display apparatus changes according to the attitude information. If the angle rotation sensor senses a change in the angle, it indicates that the posture has changed. The display apparatus may further determine whether the attitude of the display apparatus represented by the attitude information satisfies the change condition. If the attitude information satisfies the change condition, the display apparatus may carry the information that the attitude of the display apparatus has changed, such as the changed screen resolution, and in identification information and transmit the identification information to the data apparatus. Thus, the data apparatus may determine the content display attribute information of the second display signal that is transmitted according to the changed screen resolution of the display apparatus, e.g., the resolution of the image corresponding to the display data of the unit display signals in the second display signal output by the data apparatus. The display apparatus may cause the resolution of the image to match the screen resolution of the display apparatus.

The apparatus display attribute information may include the screen resolution after the attitude of the display apparatus changes. For example, the screen resolution may be 1920×1080 before the attitude of the display apparatus changes. When the display apparatus rotates 90° clockwise, the screen resolution of the display apparatus may change to 1080×1920.

Beside the apparatus display attribute information, the identification information may include device mode information. When the device mode information includes a duplication mode, the image displayed by the display apparatus may include the duplicated image of the image displayed by the data apparatus. When the device mode information includes an extension mode, the image displayed by the display apparatus may include the extension image of the image displayed by the data apparatus.

At S305, the display apparatus obtains the second display signal from the data apparatus.

After the data apparatus receives the identification information transmitted by the display apparatus, the device mode information included in the identification information may be different from the device mode information before the attitude changes. If the data apparatus includes a function of adjusting the transmission signal according to the device mode information, the data apparatus may transmit the second display signal corresponding to the device mode information. For example, when the monitor is in the duplication mode, the computer may adjust the second display signal to a display signal corresponding to the duplication mode, or when the monitor is in the extension mode, the computer may adjust the second display signal to a display signal corresponding to the extension mode. Thus, the second display signal transmitted to the display apparatus may be a signal corresponding to the mode of the display apparatus. Since the mode of the display apparatus changes, the second display signal and the first display signal may have different content display attribute information.

The data apparatus may not have the function of adjusting the transmission signal according to the device mode information, e.g., the smart terminal cannot adjust the content display attribute information of the second display signal transmitted by the smart terminal according to the mode of the display apparatus. The second display signal transmitted by the smart terminal to the display apparatus may include a signal corresponding to a default mode set in the smart terminal. Thus, the second display signal and the first display signal output by the smart terminal may include the same content display attribute information.

At S306, the display apparatus processes the second display signal to obtain the second image set in the second method.

The first method and the second method are different, or the content display attribute information of the first image set and the second image set may be different. If the content display attribute information of the first image set and the second image set is different, the first method may be same as or different from the second method.

After receiving the second display signal transmitted by the data apparatus, if the display apparatus determines that the mode of the display apparatus is the duplication mode, and the second display signal and the first display signal have the same content display attribute information, the display apparatus may process the second display signal to obtain the second image set in the second method different the first method. Since the processing methods of the first display signal and the second display signal are different, even the second display signal and the first display signal have the same content display attribute information, the content display attribute information of the first image in the first image set may be different from the content display attribute information of the second image in the second image set.

After receiving the second display signal transmitted by the data apparatus, if the display apparatus determines that the mode of the display apparatus is the extension mode, and the second display signal and the first display signal have different content display attribute information, the display apparatus may process the second display signal to obtain the second image set in the second method same as the first method. Since the first display signal and the second display signal have the different content display attribute information, even the display apparatus processes the first display signal and the second display signal in the same method, the content display attribute information of the first image of the first image set may be different from the content display attribute information of the second image in the second image set.

In the display method of embodiments of the present disclosure, when the attitude of the display apparatus changes, if detecting that the attitude information satisfies the change condition, the display apparatus may transmit the identification information including the apparatus display attribute information to the data apparatus. Thus, the data apparatus may transmit the second display signal. Then, the display apparatus may process the second display signal obtained in the second method to obtain and output the second image set. The first method may be different from the second method, or the content display attribute information of the first image set and the second image set may be different. As such, when the attitude changes, the display apparatus may adaptively adjust the image to the display mode adapt to the attitude of the display apparatus.

In some embodiments, as shown in FIG. 3, in process S306, processing the second display signal to obtain the second image set in the second method includes the following processes.

At S306a1, if the second display signal is the signal determined by the data apparatus according to the identification information, the display apparatus determines the first method as the second method.

After the data apparatus receives the identification information, the data apparatus may adjust the display signal for transmission according to the device mode information and the apparatus display attribute information, that is, the second display signal is the signal determined by the data apparatus according to the device mode information and the apparatus display attribute information. The first method for processing the first display signal and the second method for processing the second display signal may not change. The display apparatus may determine the first method as the second method.

For example, the device that can adjust the display signal for transmission according to the device mode information and the apparatus display attribute information may be a personal computer (PC). When the PC determines the mode of the display apparatus to be the duplication mode according to the received device mode information and the apparatus display attribute information, and the screen resolution is 1080×1920, the PC may determine the image corresponding to the display data of the unit display signal in the second display signal to be the duplicated image of the image output by the data apparatus, and the image resolution may be 1080×1920. The first method of the display apparatus processing the first display signal and the second method of the display apparatus processing the second display signal may be the same and both be direct output. When the PC determines the mode of the display apparatus to be the extension mode according to the received device mode information and the apparatus display attribute information, and the screen resolution is 1080×1920, the PC may determine the image corresponding to the display data of the unit display signal in the second display signal to be the extension image of the image output by the data apparatus, and the image resolution may be 1080×1920. The first method of the display apparatus processing the first display signal and the second method of the display apparatus processing the second display signal may be the same and both be direct output.

At S306a2, the display apparatus processes the second display signal to obtain the second image set in the second method.

The second display signal and the first display signal may have different content display attribute signal. The second image of the second image set and the first image of the first image set may have different content display attribute information.

The content display attribute information may include the image resolution. By taking the above example for description, before the attitude changes, the screen resolution may be 1920×1080, and the image resolution of the transmitted first display signal may be 1920×1080. After the attitude changes, the screen resolution may be 1080×1920, and the image resolution of the transmitted second display signal may be 1080×1920. Thus, the second display signal and the first display signal may have different content display attribute information. The second image of the second image set and the first image of the first image set may have different content display attribute information.

In some embodiments, as shown in FIG. 3, in process S306, processing the second display signal to obtain the second image set in the second method includes the following processes.

At S306a3, if the second display signal is a signal that is determined by the data apparatus not according to the identification information, the first display signal and the second display signal may have the same content display attribute information.

After the data apparatus receives the identification, the data apparatus may not adjust the transmitted display signal according to the identification information, that is, the second display signal may be the signal that is determined by the data apparatus not according to the identification information. The content display attribute information of the second display signal may not change, that is, the content display attribute information of the second display signal and the content display attribute information of the first display signal may be the same.

For example, the device that does not adjust the transmitted display signal according to the identification information may be a cellphone. The cellphone may determine the mode of the display apparatus to be the duplication mode according to the received identification information. The screen resolution may be 1080×1920. The cellphone may determine the second display signal according to the default setting of the cellphone. The cellphone may determine the image corresponding to the display data of the unit display signal in the second display signal to be a duplication image of the image output by the data apparatus. The image resolution may be 1920×1080. The image corresponding to the display data of the unit display signal in the first display signal transmitted by the data apparatus may be the duplication image of the image output by the data apparatus. The image resolution may be 1920×1080. Thus, the cellphone may not adjust the display signal for transmission according to the identification information. The first display signal and the second display signal may have the same content display attribute information.

At S306a4, the display apparatus processes the second display signal to obtain the second image set in the second method.

The second method and the first method may be different. The content display attribute information of the second image in the second image set and the content display attribute information of the first image in the first image set may be same or different.

For example, before the attitude changes, the display apparatus may be in the landscape mode. The screen resolution may be 1920×1080. The image resolution of the transmitted first display signal may be 1920×1080. The image resolution of the image corresponding to the display data of the unit display signal in the first display signal may match the screen resolution of the display apparatus. The display apparatus may directly output the first display signal to obtain the first image set. After the attitude changes, the display apparatus may be rotated to the portrait mode, and the screen resolution may be 1080×1920. The image resolution of the transmitted second display signal may be 1920×1080. The display apparatus may need to adjust the display data of the unit display signal in the second display signal to cause the landscape mode to change to the portrait mode which adapts to the screen resolution of the display apparatus. Thus, the first method may be different from the second method. The image resolution of the first image I the first image set may be 1920×1080. The image resolution of the second image in the second image set may be adjusted to adapt the portrait mode of the screen. For example, the image resolution of the second image may be 1080×1920. The content display attribute information of the second image in the second image set and the content display attribute information of the first image in the first image set may be different.

Before the attitude changes, the display apparatus may be in the landscape mode. The screen resolution may be 1920×1080. The image resolution of the transmitted first display signal may be 1920×1080. The image resolution of the output first image in the first image set may be 1920×1080. After the display apparatus is rotated for 180°, the display apparatus may still in the landscape mode. The screen resolution may be 1920×1080. The image resolution of the transmitted second display signal may be 1920×1080. The image resolution of the second image in the second image set may be 1920×1080. The content display attribute information of the second image in the second image set and the content display attribute information of the first image in the first image set may be same.

In some embodiments, as shown in FIG. 3, in process S306, processing the second display signal to obtain the second image set in the second method includes the following processes.

At S306b1, if the attitude information indicating the attitude of the display apparatus satisfies a first condition, the content display attribute information of the second image in the second image set and the content display attribute information of the first image in the first image set are the same.

After determining that the attitude information indicating the attitude of the display apparatus satisfies the change condition, the display apparatus may further determine whether the attitude information satisfies the first condition. The first condition may include that the angle rotation sensor senses the attitude rotation angle to be 180°. For example, if the angle is 0° before the attitude of the display apparatus changes and the angle is 180° after the attitude changes, the display apparatus may determine that the attitude information satisfies the first condition. If the angle is 270° before the attitude of the display apparatus changes, and the angle is 90° after the attitude changes, the display apparatus may determine that the attitude information satisfies the first condition. In some embodiments, unless otherwise specified, the rotation is clockwise, that is, the rotation angle is the angle of the clockwise rotation.

When the display apparatus rotates 180°, the screen resolution may not change. The content display attribute information of the second image in the second image set and the content display attribute information of the first image in the first image set may be same.

At S306b2, the display apparatus processes the second display signal to obtain the second image set in the second method. The second method is different from the first method.

The first method may include arranging the display data of the unit display signal of the first display signal according to a first sequence to obtain the first image set. The second method may include arranging the display data of the unit display signal of the second display signal according to a second sequence to obtain the second image set. The first sequence may be opposite to the second sequence.

Figure 4A:
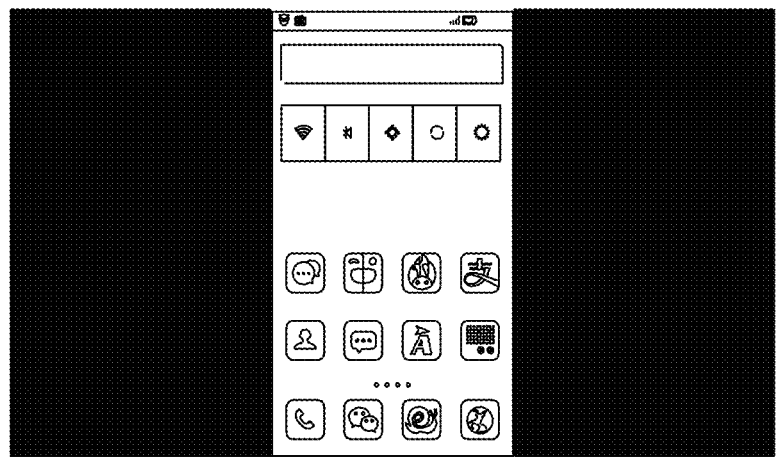
FIG. 4A illustrates a schematic diagram showing a first unit image corresponding to display data of a unit display signal in a first display signal according to some other embodiments of the present disclosure.
Figure 5A:
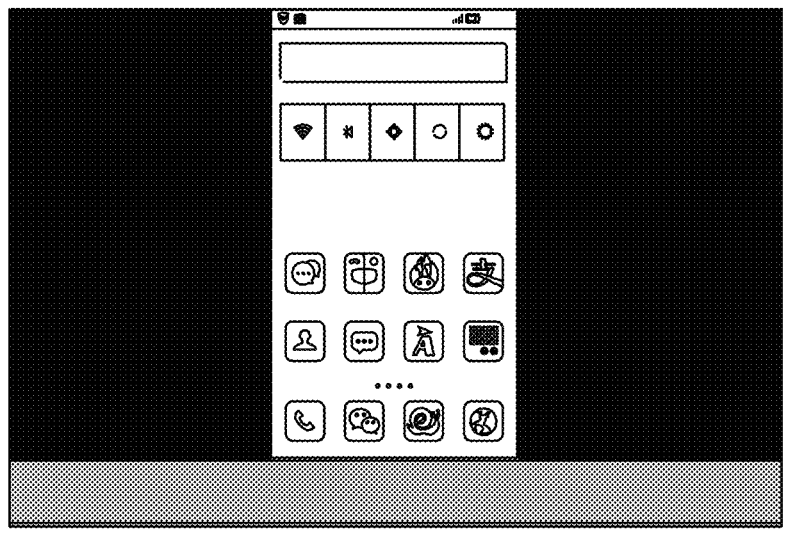
FIG. 5A illustrates a schematic diagram showing a first image output by a display apparatus according to the first unit image shown in FIG. 4A.

FIG. 4A illustrates a schematic diagram showing a first unit image corresponding to display data of a unit display signal in a first display signal according to some other embodiments of the present disclosure. When the display apparatus outputs the first unit image, the display apparatus arranges the display data of the unit display signal of the first display signal according to the first sequence from left to right and up to down to obtain the first image corresponding to FIG. 5A.

Figure 4B:
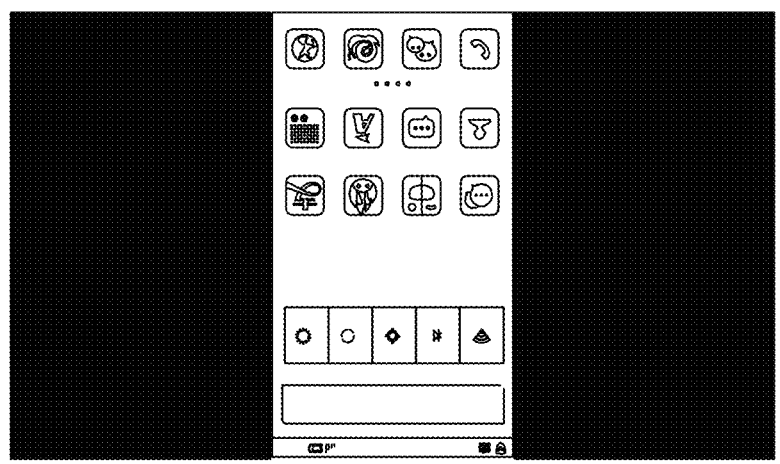
FIG. 4B illustrates a schematic diagram showing a second unit image corresponding to display data of a unit display signal in a second display signal according to some other embodiments of the present disclosure.
Figure 5B:
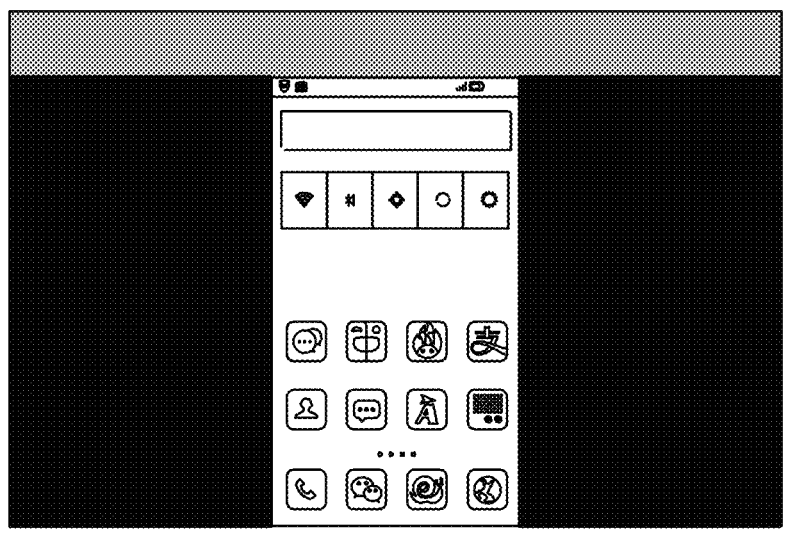
FIG. 5B illustrates a schematic diagram showing a second image output by a display apparatus according to the second unit image shown in FIG. 4B.

FIG. 4B illustrates a schematic diagram showing a second unit image corresponding to display data of a unit display signal in a second display signal according to some other embodiments of the present disclosure. When the display apparatus outputs the second unit image, to cause the output second image to match the display apparatus, the display apparatus may need to rearrange the second unit image by arranging the display data of the unit display signal of the second display signal from right to left and from down to up to obtain the second image corresponding to FIG. 5B. By comparing FIG. 5A to FIG. 5B, the display apparatus is rotated for 180°. The displayed second image and the first image are the same and are not rotated. Thus, the display apparatus may adaptively adjust the image to be in the display mode adapted to the attitude of the display apparatus.

At S306b3, if the attitude information indicating the attitude of the display apparatus satisfies a second condition, and the unit image corresponding to the display data of the unit display signal of the second display signal satisfies a third condition, the display apparatus processes the second display signal in a first sub-method to obtain the second image set.

After determining that the attitude information indicating the attitude of the display apparatus does not satisfy the first condition, the display apparatus may further determine whether the attitude information satisfies the second condition. The second condition may include that the angle rotation sensor senses that the attitude rotation angle to be 90° or 270°. For example, if the angle is 0° before the attitude of the display apparatus changes, and the angle is 90° after the attitude changes, the display apparatus determines that the attitude information satisfies the second condition. If the angle is 0° before the attitude of the display apparatus changes, and the angle is 270° after the attitude changes, the display apparatus may determine that the attitude information satisfies the second condition. In some embodiments, unless otherwise specified, the rotation is clockwise, that is, the rotation angle is the angle of the clockwise rotation.

When the display apparatus is rotated for 90° or 270°, the screen resolution may change, e.g., from 1920×1080 to 1080×1920. The content display attribute information of the second image in the second image set and the content display attribute information of the first image in the first image set may be different.

Figure 6A:
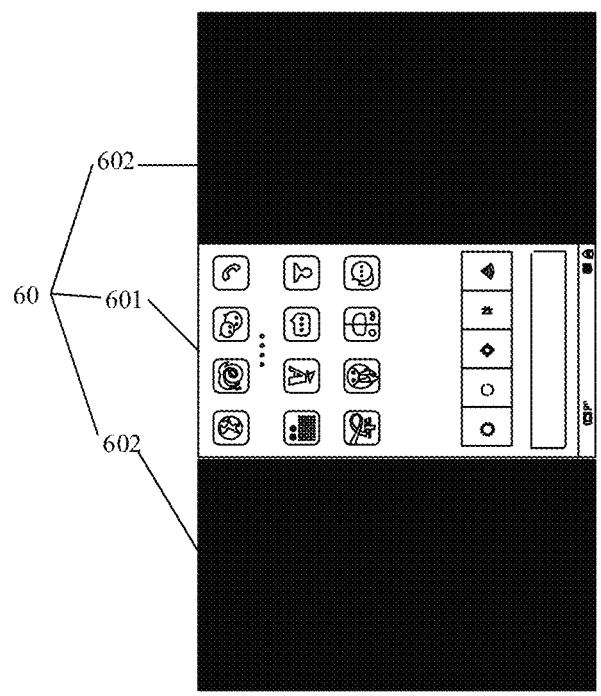
FIG. 6A illustrates a schematic diagram showing a second unit image corresponding to display data of a unit display signal in a second display signal according to some embodiments of the present disclosure.

If the data apparatus includes a cellphone 12, and the cellphone 12 is in the portrait mode, after the display apparatus is rotated for 90°, the image resolution of the second unit image corresponding to the display data of the unit display signal in the second display signal transmitted by the cellphone may be 1080×1920. FIG. 6A illustrates a schematic diagram showing a second unit image corresponding to display data of a unit display signal in a second display signal according to some embodiments of the present disclosure. The data apparatus may need to fill fill data 602 for a target content 601 to obtain a second unit image 60. Thus, the display apparatus may determine that the second unit image includes black edges.

The first sub-method may be one of the second methods.

At S306b4, if the attitude information indicating the attitude of the display apparatus satisfies the second condition, the unit image does not satisfy the third condition, and the display apparatus processes the second display signal in a method different from the first sub-method to obtain the second image set.

Figure 6B:
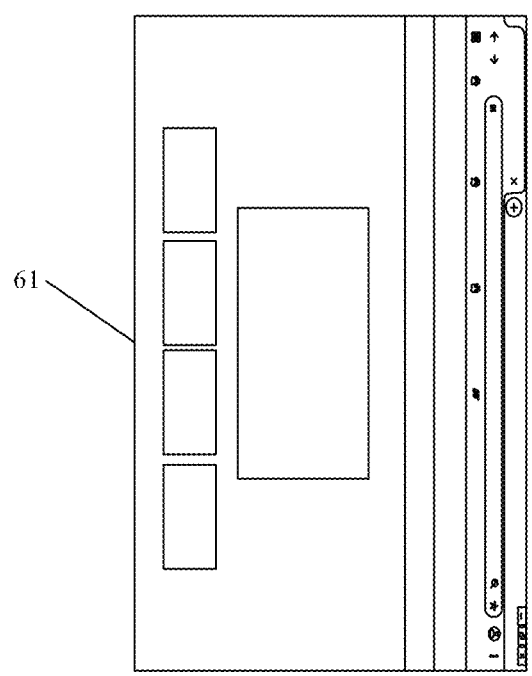
FIG. 6B illustrates a schematic diagram showing a second unit image corresponding to display data of a unit display signal in a second display signal according to some embodiments of the present disclosure.

If the data apparatus includes a computer 11, the image resolution of the second unit image corresponding to the display data of the unit display signal of the second display signal may be 1080×1920. The data apparatus may not need to fill the fill data for the second unit image. FIG. 6B illustrates a schematic diagram showing a second unit image corresponding to display data of a unit display signal in a second display signal according to some embodiments of the present disclosure. As shown in FIG. 6B, the second unit image 61 does not include the fill data. The display apparatus may determine that the second unit image does not include the black edges.

In some embodiments, when the display apparatus determines that the second unit image to be the image shown in FIG. 6A, in process S306b3, if the attitude information indicating the attitude of the display apparatus satisfies a second condition, and the unit image corresponding to the display data of the unit display signal of the second display signal satisfies a third condition, processing the second display signal in a first sub-method to obtain the second image set include the following processes.

At S6b31, if a predetermined edge of the unit image includes the fill data greater than a first threshold, the unit image satisfies the third condition.

The fill data may be filled when the data apparatus generates the second display signal, that is the fill data 602 in FIG. 6A. The display apparatus may determine whether a ratio of the black edge of the edge of the unit image to the whole image is greater than the first threshold. When the ratio of the black edge is greater than the first threshold, the display apparatus may determine that the unit image corresponding to the display data of the unit display signal of the second display signal satisfies the third condition. When the ratio of the black edge is smaller than the first threshold, the display apparatus may determine that the unit image corresponding to the display data of the unit display signal of the second display signal does not satisfy the third condition.

In connection with the screen resolution of the cellphone, the first threshold may include any value between 28% to 33%. The predetermined edge may include left and right two side edges of the second unit image or up and down two side edges of the second unit image.

At S6b32, the display apparatus processes the second display signal in the first sub-method to obtain a third image set.

The first sub-method may include processing the display data of the unit display signal of the second display signal to obtain a third image. The third image and the unit image may satisfy the second condition.

Figure 7:
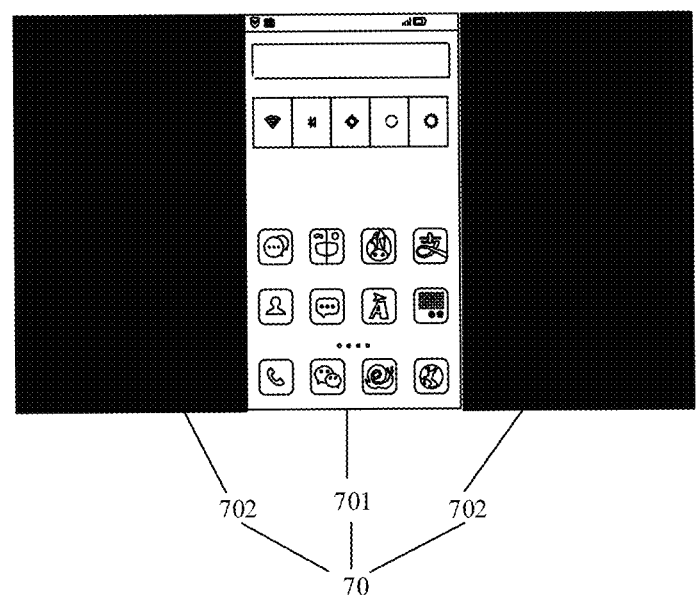
FIG. 7 illustrates a schematic diagram showing a third image obtained by the display apparatus processing the second unit image shown in FIG. 6A using a first sub-method according to some embodiments of the present disclosure.

As shown in FIG. 6A, since the second unit image is rotated 90°, to cause the second image to adapt to the display apparatus, the display apparatus processes the second display signal in the first sub-method. In some embodiments, the display apparatus may rotate the second unit image 90° counterclockwise to obtain the third image set. FIG. 7 illustrates a schematic diagram showing a third image obtained by the display apparatus processing the second unit image shown in FIG. 6A using a first sub-method according to some embodiments of the present disclosure. The display apparatus may process the unit images of the second display signal to obtain the third image set.

At S6b33, the display apparatus determines that the target content of the third image in the third image set.

The target content may include non-fill data. The target content may match the display content output by the data apparatus.

As shown in FIG. 6A and FIG. 7, the display apparatus rotates the unit image to obtain the third image in the first sub-method, which does not change the display data of the image. The display apparatus obtains fill data 702 and target content 701.

At S6b34, the display apparatus performs enlargement on the target content according to the apparatus display attribute information to obtain the second image set.

The apparatus display attribute information may include the screen resolution 1080×1920 of the display apparatus.

Figure 8:
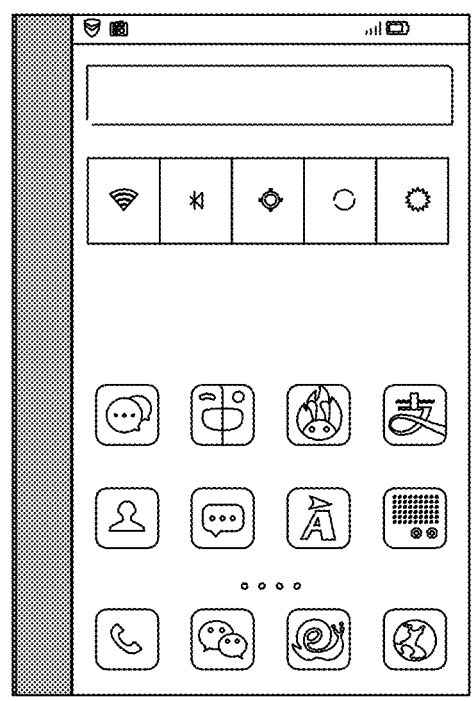
FIG. 8 illustrates a schematic diagram showing a second image obtained by the display apparatus performing processing according to the third image shown in FIG. 7 according to some embodiments of the present disclosure.

The display apparatus may perform enlargement on the target content 701 shown in FIG. 7 to obtain the second image shown in FIG. 8. The third images in the third image set may be processed through process S6b33 and S6b34 to obtain the second image set.

In some embodiments, when there is no fill data, in process S306b4, processing the second display signal in the method different from the first sub-method to obtain the second image set includes the following processes.

At S6b41, if the unit image satisfies a fourth condition, the display apparatus processes the second display signal in the second sub-method to obtain the second image set.

If a ratio of a horizontal pixel number to a vertical pixel number of the unit image (i.e., a ratio of a width and a height of the unit image) is greater than a second threshold, the unit image satisfies a fourth condition.

As shown in FIG. 6B, when the second unit image does not include the black edge, the display apparatus further determines whether the second unit image satisfies the fourth condition, that is, whether the ratio of the horizontal pixel number and the vertical pixel number of the second unit image is greater than the second threshold. The second threshold may be 1. Thus, the display apparatus may determine whether the ratio of the horizontal pixel number and the vertical pixel number of the second unit image is greater than 1. When the ratio of the horizontal pixel number and the vertical pixel number of the second unit image is greater than 1, the display apparatus may process the second display signal in the second sub-method to obtain the second image set.

The second sub-method may include processing the display data of the unit display signal of the second display signal to obtain the third image. The third image and the unit image may satisfy the second condition. The display apparatus may zoom out the third image according to the apparatus display attribute information to obtain the second image.

Figure 9:
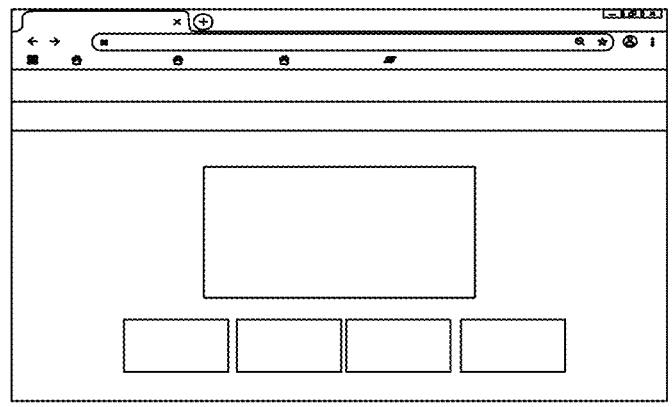
FIG. 9 illustrates a schematic diagram showing a third image obtained by the display apparatus processing the second unit image shown in FIG. 6B using a second sub-method according to some embodiments of the present disclosure.

FIG. 9 illustrates a schematic diagram showing a third image obtained by the display apparatus processing the second unit image shown in FIG. 6B using a second sub-method according to some embodiments of the present disclosure. Compared FIG. 9 to FIG. 6B, the third image shown in FIG. 9 and the second unit image shown in FIG. 6B satisfies the second condition, that is, the third image is rotated 90° to obtain the second unit image. The apparatus display attribute information may include that the screen resolution of the display apparatus is 1080×1920. The display apparatus zooms in the third image shown in FIG. 9 according to the screen resolution to obtain a second image 1001 shown in FIG. 10.

Figure 10:
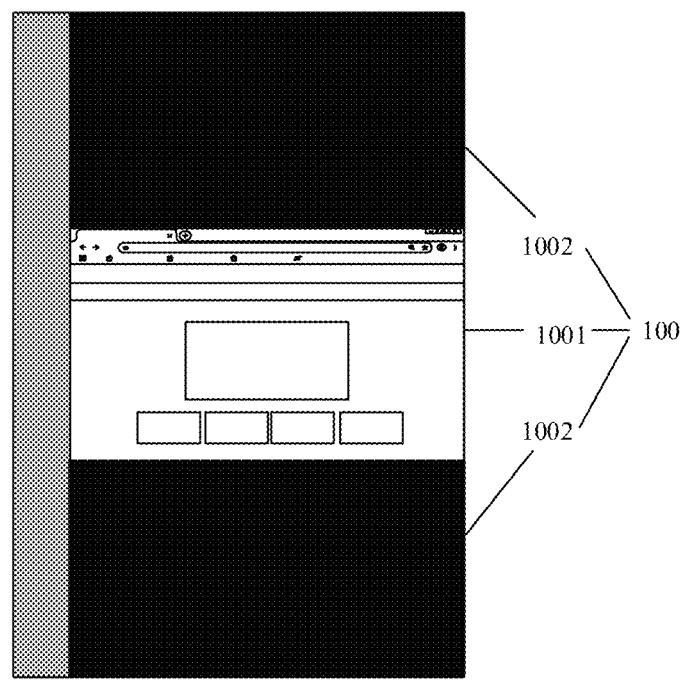
FIG. 10 illustrates a schematic diagram showing a second image obtained by the display apparatus performing processing according to the third image shown in FIG. 9 according to some embodiments of the present disclosure.

In some embodiments, after obtaining the second image, the display apparatus may perform filling on the second image according to the apparatus display attribute information to obtain an updated second image. As shown in FIG. 10, the second image 1001 may be filled according to the apparatus display attribute information to obtain fill data 1002 to obtain the updated second image 100. The execution body of performing a filling process may include the display apparatus. The second image received by the display apparatus may not include fill data. The fill data in process S6b31 is filled by the data apparatus, and the second image received by the display apparatus includes the fill data.

The display apparatus may perform filling on the unit images in the second display signal to obtain the third image set. Then, the display apparatus may process the third images in the third image set through process S6b41 to obtain the second image set.

At S6b42, if the unit image does not satisfy the fourth condition, the display apparatus processes the second display signal in a third sub-method to obtain the second image set.

The second sub-method or the third sub-method may include one of the second methods.

The third sub-method may include restoring the second display signal to obtain the second image set.

When the second unit image does not include the black edge, the display apparatus may further determine whether the ratio of the width and the height of the second unit image is greater than 1. If the ratio of the width and the height of the second unit image is smaller than or equal to 1, the display apparatus may process the second display signal in the third sub-method to obtain the second image set.

Figure 11:
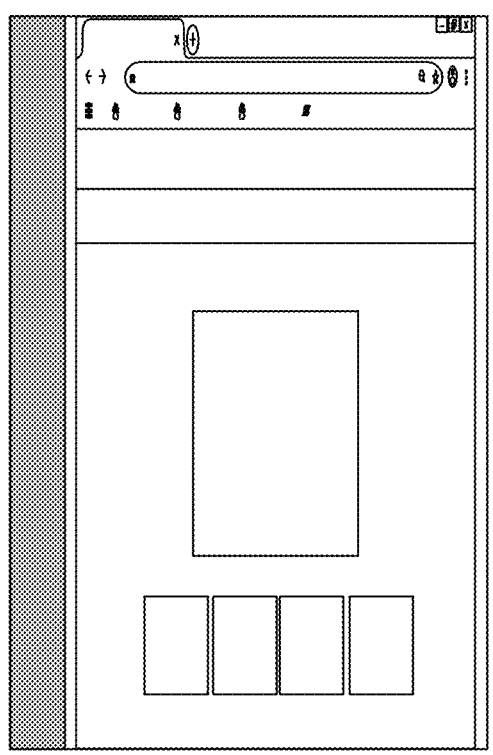
FIG. 11 illustrates a schematic diagram showing a second unit image corresponding to display data of a unit display signal in a second display signal according to some embodiments of the present disclosure.

FIG. 11 illustrates a schematic diagram showing a second unit image corresponding to display data of a unit display signal in a second display signal according to some embodiments of the present disclosure. As shown in FIG. 11, when the ratio of the width and the height of the second unit image is smaller than or equal to 1, the second unit image is the second unit image corresponding to the second display signal transmitted by the computer in the extension mode. Thus, the display apparatus may not need to perform rotation, zoom in, or zoom out on the second unit image. The display apparatus may output according to the content display attribute information of the second display signal to obtain the second image set.

Figure 12:
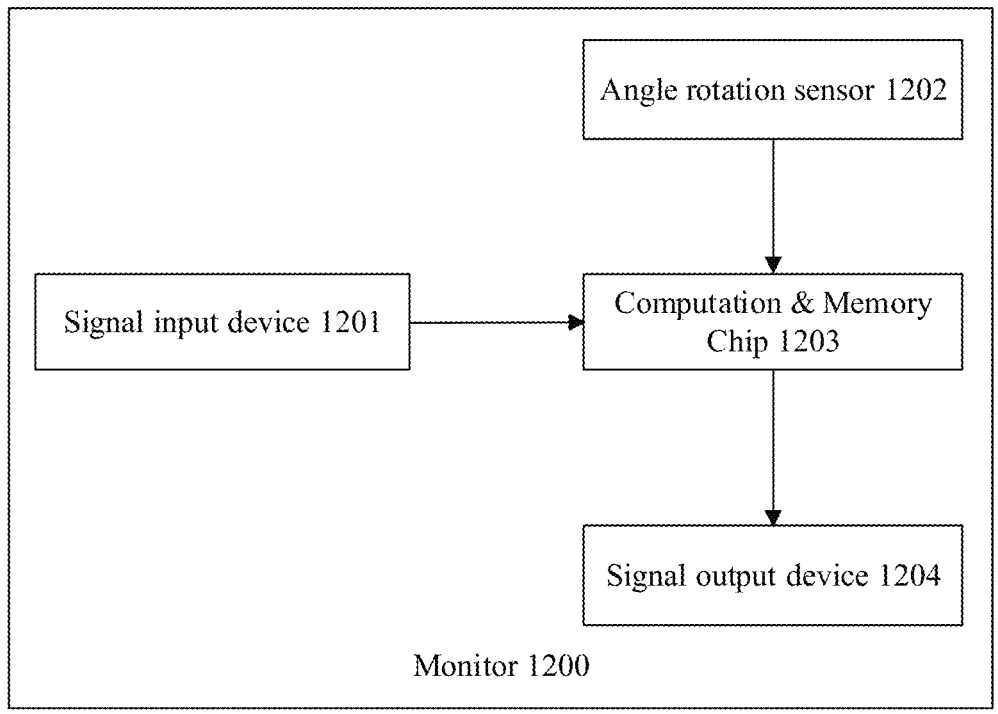
FIG. 12 illustrates a schematic structural diagram of a monitor according to some embodiments of the present disclosure.

Based on the display method of embodiments of the present disclosure, embodiments of the present disclosure provide a monitor with a rotation function. The monitor may rotate automatically without installing any driver at the source (corresponding to the data apparatus above). FIG. 12 illustrates a schematic structural diagram of a monitor 1200 according to some embodiments of the present disclosure. As shown in FIG. 12, the monitor 1200 includes a signal input device 1201, an angle rotation sensor 1202, a computation & memory chip 1203, and a signal output device 1204. The monitor 1200 may sense a physical rotation angle of its own through the angle rotation sensor 1202 to automatically rotate a display screen of the monitor 1200. In some other embodiments, the computation & memory chip 1203 may include a computation chip and a memory chip independent of each other.

The signal input device 1201 may include but be not limited to interfaces such as Video Graphics Array (VGA), High-Definition Multimedia Interface (HDMI), Universal Serial Bus type-C (USB C), etc.

The angle rotation sensor 1202 may be arranged on a side of the monitor 1200 and configured to sense the rotation angle of the screen. The angle rotation sensor 1202 may include a gravity sensor (G-sensor) and an angle sensor.

Figure 13:
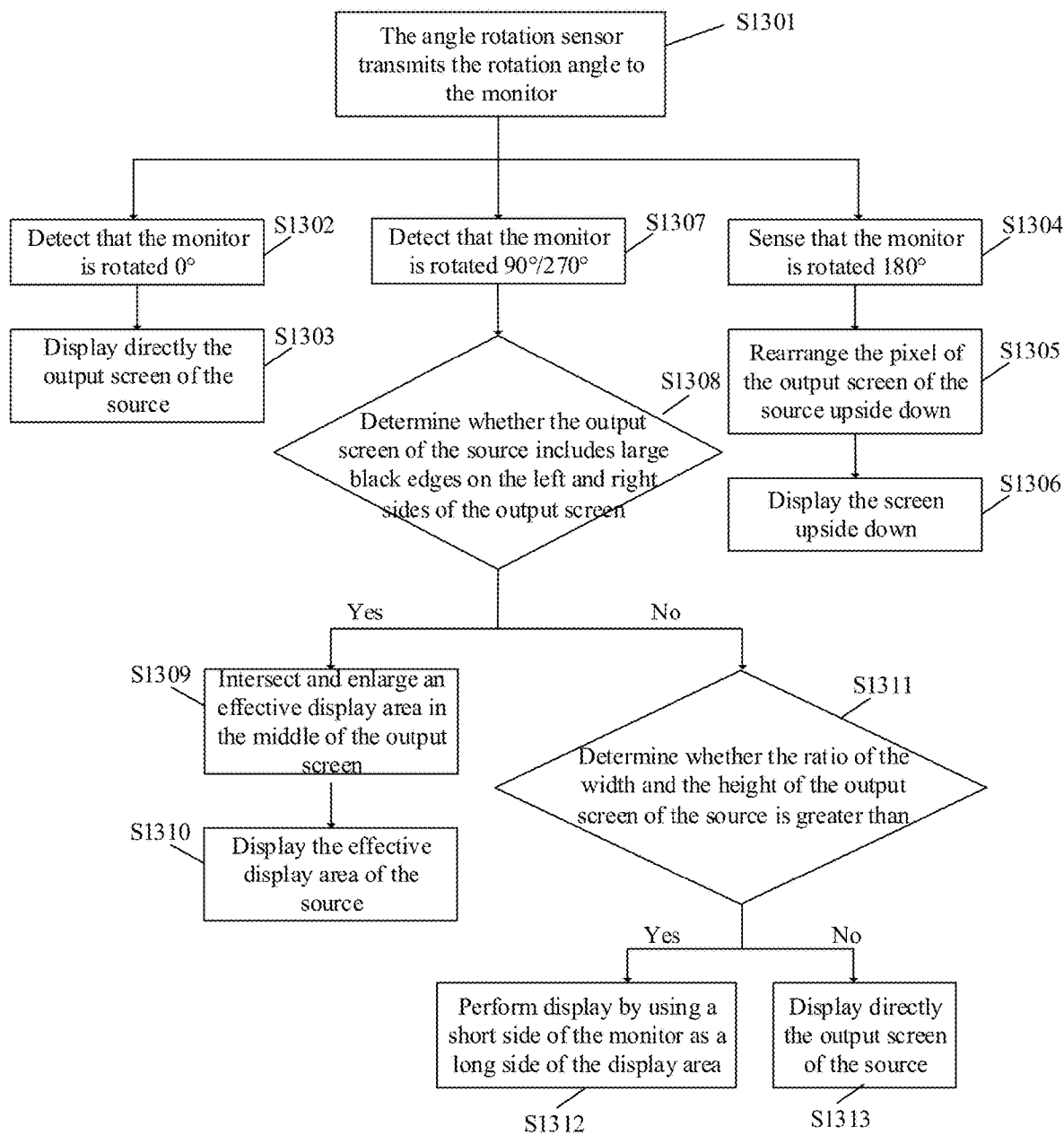
FIG. 13 illustrates a schematic flowchart showing an operation of the monitor according to some embodiments of the present disclosure.

Embodiments of the present disclosure further provide a display method. FIG. 13 illustrates a schematic flowchart showing an operation of the monitor according to some embodiments of the present disclosure. As shown in FIG. 13, the operation of the monitor includes the following processes.

At S1301, the angle rotation sensor transmits the rotation angle to the monitor.

The angle rotation sensor, e.g., the G-sensor, may sense the rotation angle of the monitor and transmit the rotation angle to the monitor.

The monitor may detect its own rotation angle first and perform different processing on the output screen of the source according to different rotation angles.

At S1302, the angle rotation sensor detects that the monitor is rotated 0°.

At S1303, the monitor displays directly the output screen of the source.

When the angle rotation sensor senses that the rotation angle is 0°, the monitor may directly display the output screen of the source.

Figure 14:
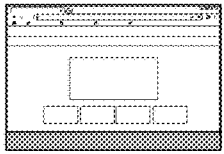
FIG. 14 illustrates a schematic diagram showing display effects of output pictures in different rotation angles when the monitor is connected to different source terminals according to some embodiments of the present disclosure.

FIG. 14 illustrates a schematic diagram showing display effects of output pictures in different rotation angles when the monitor is connected to different sources according to some embodiments of the present disclosure. When the monitor is rotated 0°, the output screens are shown in a, e, and h of FIG. 14.

At S1304, the angle rotation sensor senses that the monitor is rotated 180°.

At S1305, the monitor rearranges the pixel of the output screen of the source upside down.

At S1306, the monitor displays the screen upside down.

When the angle rotation sensor sense that the rotation angle is 180°, the monitor may the rearrange the pixel information of the output screen of the source by arranging the pixels upside down and left to right and then output the rearranged screen. The output screens are then shown in b, f, and i in FIG. 14.

At S1307, the angle rotation sensor detects that the monitor is rotated 90°/270°.

At S1308, the display apparatus determines whether the output screen of the source includes large black edges on the left and right sides of the output screen.

When the output screen of the source includes the large black edges on the left and right sides of the output screen, the output screen of the source may be a screen output by the cellphone in the portrait mode. Then, the display proceeds to process S1309. When the output screen of the source does not include the large black edges on the left and right sides of the output screen, the output screen of the source may be a screen output by the PC or the cellphone in the landscape mode. Then the display proceeds to process S1311.

The monitor detecting whether the output screen of the source includes the large black edges on the left and right sides of the output screen includes the monitor detecting the output screen of the source by scanning the screen from two sides to middle. If an area of 28.5% of the screen from the two sides to the middle includes the black edges, the display may determine that the output screen includes the large black edges on the left and right sides of the output screen.

At S1309, the display apparatus intersects and enlarges an effective display area in the middle of the output screen.

At S1310, the monitor displays the effective display area of the source.

If the area of 28.5% of the screen from the two sides to the middle includes the black edges, the display may determine that the screen is the output screen of the cellphone/pad in the portrait mode. The displays may need to process the screen.

Figure 15:
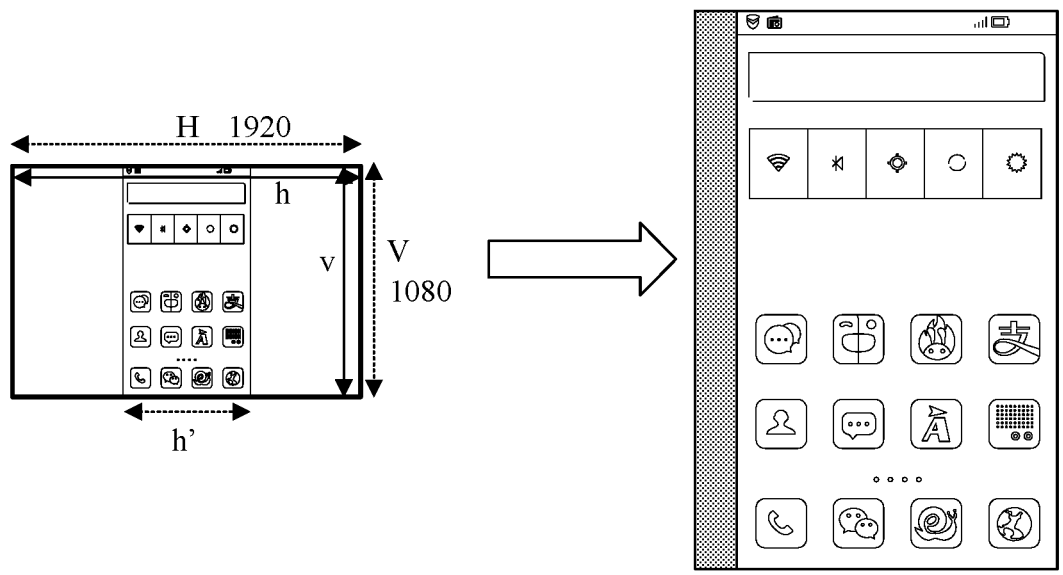
FIG. 15 illustrates a schematic diagram showing an effective picture when the monitor rotates 90°/270° according to some embodiments of the present disclosure.

FIG. 15 illustrates a schematic diagram showing an effective screen when the monitor is rotated 90°/270° according to some embodiments of the present disclosure. As shown in FIG. 15, a ratio of the width and the height of the monitor is H/V. After the source is connected to the monitor, the ratio of the width and the height of the output screen is h/v. The display detects the output screen of the source from the two sides to the middle. The display may detect that the ratio of the width and the height of the effective display area of the output screen of the source is h'/V. If h'/V is greater than V/H, the monitor may display the display screen of h'/V on the monitor of V/H. The display may enlarge the display screen of the source by maintaining the ratio of the width and the height based on a V side of the monitor. Then, the monitor may enlarge the original h' side direction of the display screen proportionally until the display screen of the source is displayed to the whole screen of the monitor by ensuring a maximal magnification not to exceed 20%.

If h'/V is smaller than V/H, the monitor may display the display screen of h'/V on the monitor of V/H. Then, the monitor may enlarge the display screen of the source by maintaining the ratio of the width and the height based on a H side of the monitor. Then, the monitor may enlarge the original V side direction of the display screen proportionally until the display screen of the source is displayed to the whole screen of the monitor by ensuring the maximal magnification not to exceed 20%.

At S1311, the monitor determines whether the ratio of the width and the height of the output screen of the source is greater than.

When the ratio of the width and the height of the output screen of the source is greater than 1, the output screen of the source may include a duplication screen of the PC or a screen output by the cellphone in the landscape mode. Then, the monitor proceeds to process S1312. When the ratio of the width and the height of the output screen of the source is smaller than or equal to 1, the output screen of the source may include a screen output by the PC in the extension mode. Then, the monitor proceeds to process S1313.

At S1312, the monitor performs display by using a short side of the monitor as a long side of the display area.

If the monitor detects that the ratio of the width and the height of the output screen of the source is greater than 1, the monitor may perform zoom on the output screen of the source using the short side of the monitor as the long side of the display area by maintaining the ratio of the width and the height of the output screen of the source. If the rearranged screen does not fill the whole display screen, the monitor may add black edges to the up and down of the monitor and output the screen shown in c and j in FIG. 14.

At S1313, the monitor displays directly the output screen of the source.

If the ratio of the width and the height of the output screen is smaller than or equal to 1, the monitor may directly display the output screen of the source on the monitor by maintaining the ratio of the width and the height of the output screen of the source. A final display effect is shown in d of FIG. 14.

Computation and storage related to processes of detecting the output screen of the source, intersecting the effective display area, and rotating the screen may be completed by the computation & memory chip.

The operation process shown in FIG. 13 is described below.

1) by taking a full high definition (FHD) monitor of 16:9 monitors as an example, if the source that is connected to the FHD monitor is a pad, when the pad is applied in the portrait mode, the monitor may rotate 90°.

The monitor may detect the that the monitor rotates 90° through the angle rotation sensor. Then, the monitor may scan the output screen of the source from the two sides to the middle. When the 28.5% area scanned by the monitor from the two sides to the middle of the output screen includes the black edges, the monitor may determine the output screen may be output by the cellphone or the pad in the portrait mode. Further, the monitor may obtain a screen of 1920× 1080 of the display area of the output screen. The monitor may scan the output screen to determine an effective area of 810×1080. Since 810/1080 is greater than 1080/1920, a display screen of 810×1080 may be displayed on the monitor of 1080×1920. The monitor may intersect the display screen of an 810×1080 area. Based on the short side of the monitor, the display screen of 810×1080 may be enlarged to 1080×1440. The pixel area of long side 1440 may be enlarged by 20% to 1728 pixels. A screen of an area of 1080×1728 may be displayed on the rotated monitor (1080× 1920). Black edges of 96 pixels may be left on an up and down sides of the monitor.

2) By taking the FHD monitor of the 16:9 monitors as an example, if the source connected to the monitor is a cellphone, when the cellphone is applied in the portrait mode, the monitor may rotate 90°.

After the cellphone is connected to the monitor, the resolution of the output screen may be 1920×1080. The monitor may detect that the monitor rotates 90° through the angle rotation sensor. Then, the monitor may scan the output screen of the source from the two sides to the middle. When the 28.5% area of the output screen scanned from the two sides to the middle includes the black edges, the monitor may determine that the screen is the output screen of the cellphone or the pad in the portrait mode. Further, the effective display area of the output screen that is scanned may be 512×1080. Since 512/1080 is smaller than 1080/1920, the display screen of 512×1080 may be displayed on the monitor of 1080×1920. Based on the long side of the monitor, the display screen may be enlarged to a screen of 912×1920 by maintaining the ratio of the width and the height. Then, the pixel area of 910 may be enlarged 18% until the short side fills the whole screen. Thus, on the rotated monitor (1080×1920), the display screen may be an area of 1080×1920. No black edges may be on the up and down sides of the monitor.

The cellphone may be applied in the landscape mode any time. the output screen resolution of the cellphone may be 1920×1080. The monitor may detect that the monitor rotates 90° through the angle rotation sensor. Then, the monitor may scan the output screen of the source from the two sides to the middle. When the 28.5% area scanned from the two sides to the middle does not include the black edges, the monitor may determine that the screen may be a landscape screen of the PC or cellphone. Further, the monitor may determine that the ratio of the width and the height of the display screen 1920/1080 is greater than 1, the output screen of the source may be zoomed using the short side of the monitor as the long side of the display area by maintaining the ratio of the width and the height of the output screen and displayed in the middle of the monitor. The black edges may be added to the up and down sides of the monitor.

3) by taking the FHD monitor of the 16:9 monitors as an example, when a 16:9 FHD laptop is connected to the FHD monitor, the monitor may rotate 90°.

The laptop may set a display mode to the duplication mode. The output screen may be a screen of 1920×1080. The monitor may detect that the monitor may rotate 90° through the angle rotation sensor. Then, the monitor may scan the output screen of the source from the two sides to the middle of the output screen. If the 28.5% area of the screen from the two sides to the middle does not include black edges, the monitor may determine the screen to be a screen of the PC or the cellphone in the landscape mode. Further, the monitor may determine that the ratio 1920/1080 of the width and the height of the display screen is greater than 1, the output screen of the source may be zoomed using the short side of the monitor as the long side of the display area by maintaining the ratio of the width and the height of the output screen and displayed in the middle of the monitor. The black edges may be added to the up and down sides of the monitor.

The laptop may set the display mode to be the extension mode. The output screen may be a screen of 1080×1920. The monitor may detect that the monitor may rotate 90° through the angle rotation sensor. Then, the monitor may scan the output screen from the two sides to the middle. If the 28.5% area of the screen from the two sides to the middle does not include the black edges, the monitor may determine that the screen may be a screen of the PC or the cellphone in the landscape mode. Further, the monitor may determine that the ratio of the width and the height of the display screen is smaller than 1, the monitor may directly display the output screen of the source on the monitor by maintaining the ratio of the width and height.

In embodiments of the present disclosure, the monitor may detect its own physical rotation angle and may perform different processing on different output screens of the cellphone and the PC. Thus, the screen of the monitor may rotate automatically. The hardware may be realized through the work between the signal input device, the angle rotation sensor, the computation & memory chip, and the signal output device. The angle rotation sensor may be arranged on the side of the monitor screen to sense the rotation angle of the screen. The monitor may scan from the two sides to the middle of the display screen through the computation & memory chip to determine whether there are large black edges. If both sides include the large black edges, the effective display area may be intersected, and the black edges may be removed. The effective display area may be enlarged and displayed on the monitor. If the monitor determines that the output screen of the source does not have large black edges, the output screen of the source end may be directly displayed on the monitor.

For a monitor with automatic rotation function, and the user may not need to install any driver at the source, and the display screen may realize automatic rotation. The angle rotation sensor may be arranged on one side of the screen. The angle rotation sensor may determine the rotation angle of the monitor according to the rotation angle of the screen. The response may be sensitive. When the monitor rotates at different angles, the monitor may process different source screens accordingly to achieve a largest area to display the effective screen of the source and improve the user experience. A determination process of the monitor through the computation & memory chip may be always in a determination status. As soon as the output screen of the source changes, the monitor may immediately detect the change of the output screen. The monitor may adjust the output screen in time to adapt to the status change of the source.

In some embodiments, the display apparatus may continuously detect whether the content display attribute information of the display signal transmitted by the data apparatus changes, that is, the display may continuously detect whether the resolution of the output screen of the source changes. When the monitor detects that the resolution of the output screen of the source end changes, the monitor may readjust the display screen based on the changed resolution. Thus, the screen displayed on the monitor may adapt to the status change of the source.

In addition, the display apparatus may also need to continuously detect whether its attitude is changed, that is, the angle rotation sensor of the monitor may continuously sense the angle of the screen. When the monitor senses that the monitor rotates, the monitor may process the received display signal to make the screen displayed by the monitor to adapt to its own status change.

After the data apparatus or the display apparatus is rotated, the monitor may continue to perform same processing on the display signal subsequently transmitted by the data apparatus in the changed processing method until the monitor detects that the attitude of the data apparatus or the display apparatus is changed again.

Based on embodiments of the present disclosure, embodiments of the present disclosure provide a display apparatus. Modules included in the device and units included in the modules may be implemented by a processor in a computer device or a specific logic circuit. In some embodiments, the processor may include a central processing unit (CPU), a microprocessor unit (MPU), a digital signal processor (DSP), or a field programmable gate array (FPGA), etc.

Figure 16:
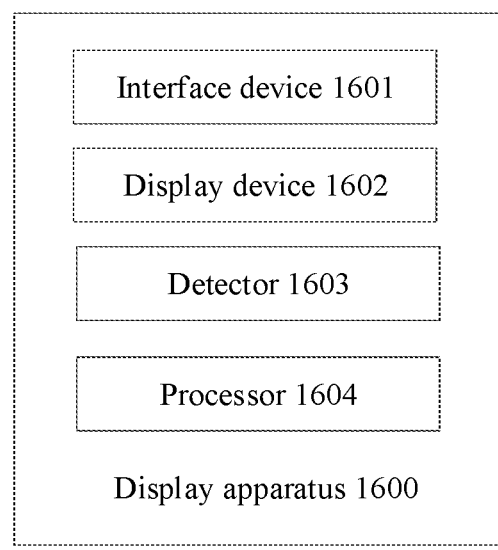
FIG. 16 illustrates a schematic structural diagram of a display apparatus according to some embodiments of the present disclosure.

Embodiments of the present disclosure further provide a display apparatus. FIG. 16 illustrates a schematic structural diagram of the display apparatus 1600 according to some embodiments of the present disclosure. As shown in FIG. 16, the display apparatus 1600 includes an interface device 1601, a display device 1602, a detector 1603, and a processor 1604.

The interface device 1601 may be configured to obtain a display signal from a data apparatus connected to the display apparatus 1600.

The display device 1602 may be configured to output an image set corresponding to the display signal.

The detector 1603 may be configured to detect an attitude information indicating an attitude.

The processor 1604 may be configured to process a first display signal in a first method to obtain a first image set. After the attitude information indicating the attitude of the display apparatus satisfies the change condition, the processor 1604 may be configured to process a second display signal in a second method to obtain a second image set.

The first method may be different from the second method, or the content display attribute information of the first image set and the content display attribute information of the second image set may be different.

In some embodiments, the processor 1604 may include a transmission circuit, a first acquisition circuit, and a second acquisition circuit.

The transmission circuit may be configured to, if the attitude information indicating the attitude of the display apparatus satisfies the change condition, transmit identification information including apparatus display attribute information to the data apparatus.

The first acquisition circuit may be configured to obtain the second display signal from the data apparatus. The first display signal and the second display signal may include same or different content display attribute information.

The second acquisition circuit may be configured to process the second display signal in the second method to obtain the second image set.

In some embodiments, the second acquisition circuit may further include a determination sub-circuit and a first acquisition sub-circuit.

The determination sub-circuit may be configured to, if the second display signal is a signal determined by the data apparatus according to the identification information, determine the first method as the second method.

The first acquisition sub-circuit may be configured to process the second display signal in the second method to obtain the second image set.

The second display signal and the first display signal may include different content display attribute information. Content display attribute information of a second image in the second image set may be different from content display attribute information of a first image in the first image set.

In some embodiments, the second acquisition circuit may further include a second acquisition sub-circuit.

The second acquisition cub-circuit may be configured to, if the second display signal is not the signal determined by the data apparatus according to the identification information, and the first display signal and the second display signal have the same content display attribute information, process the second display signal in the second method to obtain the second image set.

The second method may be different from the first method. The content display attribute information of the second image in the second image set may be same or different from the content display attribute information of the first image in the first image set.

In some embodiments, the second acquisition circuit may further include a third acquisition sub-circuit.

The third acquisition sub-circuit may be configured to, if the attitude information indicating the attitude of the display apparatus satisfies a first condition, and the first display signal and the second display signal have the same content display attribute information, process the second display signal in the second method to obtain the second image set. The second method may be different from the first method.

The first method may include arranging display data of an unit display signal of the first display signal according to a first sequence to obtain the first image set.

The second method may include arranging display data of an unit display signal of the second display signal according to a second sequence to obtain the second image set. The first sequence may be opposite to the second sequence.

In some embodiments, the second acquisition circuit may further include a fourth acquisition sub-circuit and a fifth acquisition sub-circuit.

The fourth acquisition sub-circuit may be configured to, if the attitude information indicating the attitude of the display apparatus satisfies a second condition, and an unit image corresponding to the display data of the unit display signal of the second display signal satisfies a third condition, process the second display signal in a first sub-method to obtain the second image set.

The fifth acquisition sub-method may be configured to, if the unit image does not satisfy the third condition, process the second display signal in a method different from the first sub-method to obtain the second image set.

The first sub-method may be one of the second methods.

In some embodiments, the fourth acquisition sub-circuit may further include a first acquisition unit, a determination unit, and an enlargement unit.

The first acquisition unit may be configured to, if a predetermined edge of the unit image includes fill data that is greater than a first threshold, determine that the unit image satisfies the third condition, and process the second display signal in the first sub-method to obtain a third image set. The fill data may be filled when the data apparatus generates the second display signal.

The determination unit may be configured to determine a target content of a third image in the third image set. The target content may not include the fill data and match the display content output by the data apparatus.

The enlargement unit may be configured to enlarge the target content according to the apparatus display attribute information to obtain the second image set.

The first sub-method may include processing the display data of the unit display signal of the second display signal to obtain the third image. The third image and the unit image may satisfy the second condition.

In some embodiments, the fifth acquisition sub-circuit may include a second acquisition unit and a third acquisition unit.

The second acquisition unit may be configured to, if the unit image satisfies a fourth condition, process the second display signal in the second sub-method to obtain the second image set.

The third acquisition unit may be configured to, if the unit image does not satisfy the fourth condition, process the second display signal in a third sub-method to obtain the second image set.

The second sub-method or the third sub-method may be one of the second methods.

The second sub-method may include processing the display data of the unit display signal of the second display signal to obtain the third image. The third image and the unit image may satisfy the second condition. The second sub-method may further include zooming out the third image according to the apparatus display attribute information to obtain the second image. The third sub-method may include restoring the second display signal to obtain the second image set.

In embodiments of the present disclosure, if the above display method is implemented in the form of a software function module and sold or used as an independent product, the software function module may also be stored in a computer readable storage medium. Based on this understanding, essence or a part of the technical solutions of embodiments of the present disclosure part that contributes to the prior art may be embodied in the form of the software product. The computer software product may be stored in a storage medium and includes several instructions to cause a computer device (e.g., a personal computer, a server, or a network device, etc.) to execute all or part of the methods in embodiments of the present disclosure. The storage medium may include a medium that can store program codes, such as a U disk, a mobile hard disk, a read only memory (ROM), a magnetic disk, or an optical disk. Thus, embodiments of the present disclosure are not limited to any specific combination of hardware and software.

Correspondingly, embodiments of the present disclosure provide a computer-readable storage medium, which stores a computer program. When the computer program is executed by a processor, the processor may be caused to perform the steps of the method provided in embodiments of the present disclosure.

Figure 17:
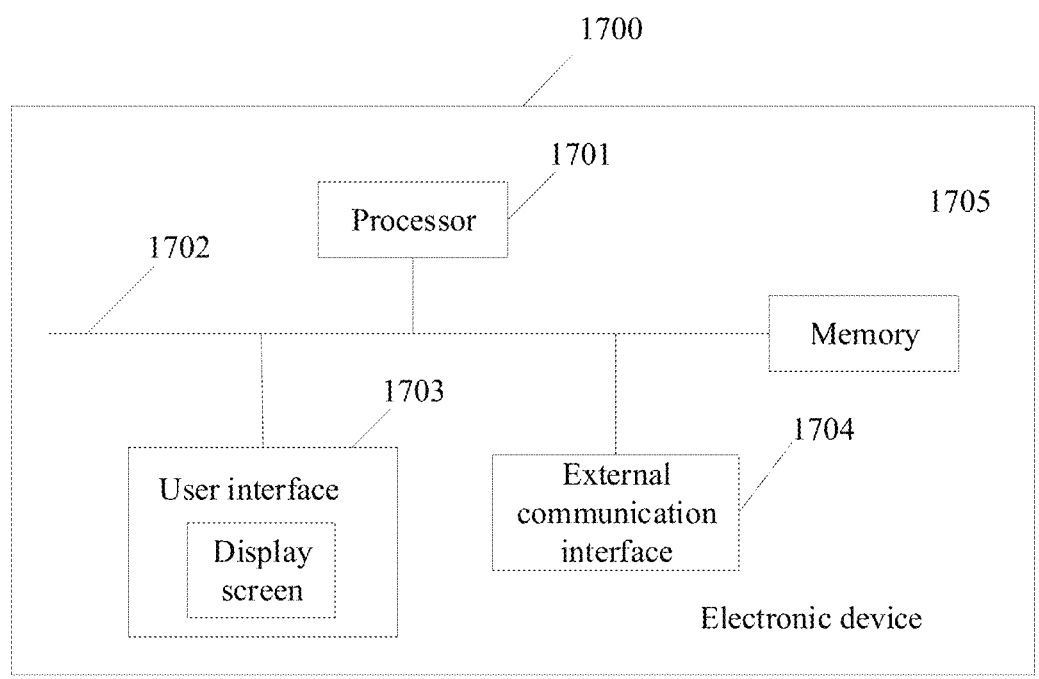
FIG. 17 illustrates a schematic structural diagram of an electronic device according to some embodiments of the present disclosure.

Embodiments of the present disclosure provides an electronic apparatus. FIG. 17 illustrates a schematic structural diagram of the electronic apparatus 1700 according to some embodiments of the present disclosure. As shown in FIG. 17, the electronic apparatus 1700 includes a processor 1701, at least one communication bus 1702, a user interface 1703, at least one external communication interface 1704, and a memory 1705. The communication bus 1702 may be configured to realize connection and communication between these assemblies. The user interface 1703 may include a display screen. The external communication interface 1704 may include a standard wired interface and a wireless interface. The processor 1701 may be configured to execute the program of the display method stored in the memory to implement the steps of the display method of embodiments of the present disclosure.

The description of the display apparatus, electronic apparatus, and storage medium embodiment is similar to the description of method embodiments of the present disclosure, and has similar beneficial effects as method embodiments. For technical details not disclosed in embodiments of the display apparatus, electronic apparatus, and storage medium of the present disclosure, please refer to the description of method embodiments of the present disclosure.

The terms "one embodiment" or "an embodiment" mentioned throughout the specification means that specific features, structures, or characteristics related to embodiments of the present disclosure may include at least one embodiment of the present disclosure. Therefore, the "in one embodiment" or "in an embodiment" appearing in various places throughout the specification may not necessarily refer to a same embodiment. In addition, these specific features, structures, or characteristics may be combined in one or more embodiments in any suitable method. In embodiments of the present disclosure, the value of the sequence numbers of the above-mentioned processes does not mean the order of execution. The execution order of the processes should be determined by their functions and internal logic. The sequence numbers should not limit the implementation process of embodiments of the present disclosure. The sequence numbers of embodiments of the present disclosure are only for description, and do not represent superiority or inferiority of embodiments of the present disclosure.

The terms "include," "contain," or any other variants thereof are intended to cover non-exclusive inclusion, so that a process, method, article, or device including a series of elements not only includes those elements, but also includes other elements not explicitly listed, or elements inherent to the process, method, article, or device. If there are no more restrictions, the element defined by the sentence "including a . . . " does not exclude the existence of another identical element in the process, method, article, or device that includes the element.

In some embodiments of the present disclosure, the disclosed apparatus and method may be implemented in another way. The apparatus embodiments described above are only illustrative. For example, the division of the units is only a logical function division, and there may be another division in actual implementation, for example, multiple units or assemblies may be combined, or integrated into another system, or some features may be ignored or not implemented. In addition, the coupling, direct coupling, or communication connection between the components shown or discussed may be indirect coupling or communication connection through some interfaces, devices, or units, and may be in electrical, mechanical, or another form.

The units described above as separate components may or may not be physically separated. The components displayed as units may or may not be physical units. The components may be located in one place or distributed on multiple network units. Some or all of the units may be selected according to actual needs to achieve the objectives of the solutions of embodiments of the present disclosure.

In addition, the functional units of embodiments of the present disclosure may be all integrated into one processing unit, or each unit may be individually used as a unit, or two or more units may be integrated into one unit. The integrated unit may be implemented in the form of hardware, or in the form of hardware plus software functional units.

Those of ordinary skill in the art may understand that all or part of the steps in method embodiments may be implemented by a program instructing relevant hardware. The foregoing program may be stored in a computer readable storage medium, when is executed, causes the processor to execute the steps of method embodiments. The storage medium may include various media that can store program codes, such as a removable storage device, a read-only memory, a magnetic disk, or an optical disc.

Alternatively, if the integrated unit of the present disclosure is implemented in the form of a software function module and sold or used as an independent product, it may also be stored in a computer readable storage medium. Based on this understanding, essence or a part of the technical solutions of embodiments of the present disclosure that contributes to the prior art may be embodied in the form of a software product. The computer software product may be stored in a storage medium and include several instructions for causing one device to execute all or part of the methods described in embodiments of the present disclosure. The storage medium may include a medium that can store program codes, such as a removable storage device, a ROM, a magnetic disk, or an optical disk.

The above are only some embodiments of the present disclosure, but the scope of the present disclosure is not limited to this. Those skilled in the art can easily think of changes or substitutions within the technical scope disclosed in the present disclosure. These changes and substitutions should be within the scope of the present disclosure. Therefore, the scope of the present invention should be subject to the scope of the claims.

What is claimed is:

1. A display method, comprising:
obtaining a first display signal from a data apparatus connected to a display apparatus;
processing the first display signal in a first method to obtain a first image set and outputting the first image set;
detecting attitude information indicating an attitude; and
in response to the attitude information indicating the attitude of the display apparatus satisfying a change condition, processing a second display signal from the data apparatus to obtain a second image set and outputting the second image set, including:
in response to the attitude information indicating the attitude of the display apparatus satisfying the change condition, transmitting identification information including apparatus display attribute information to the data apparatus;
obtaining the second display signal from the data apparatus; and
processing the second display signal in a second method to obtain the second image set, including:
in response to the attitude information indicating the attitude of the display apparatus satisfying a first condition, and a unit image corresponding to display data of a unit display signal of the second display signal satisfying a second condition, processing the second display signal in a sub-method to obtain the second image set, including:
in response to a predetermined edge of the unit image including fill data that is greater than a threshold, determining the unit image to satisfy the second condition, the fill data being filled when the data apparatus generates the second display signal;
processing the second display signal in the sub-method to obtain a third image set, the sub-method including processing the display data of the unit display signal of the second display signal to obtain an image in the third image set, the image in the third image set and the unit image satisfying the first condition;
determining a target content of the image in the third image set, the target content being not the fill data and matching a display content output by the data apparatus; and
enlarging the target content according to the apparatus display attribute information to obtain the second image set; and
in response to the unit image not satisfying the second condition, processing the second display signal in a method different from the sub-method to obtain the second image set, the sub-method being a sub-method of the second method;
wherein:
the first method is different from the second method; or
content display attribute information of the first image set is different from content display attribute information of the second image set.

2. The method of claim 1, wherein the content display attribute information of the first image set is different from the content display attribute information of the second image set, and processing the second display signal in the second method to obtain the second image set further includes:
in response to the second display signal being a signal determined by the data apparatus according to the identification information, determining the first method as the second method; and
processing the second display signal in the second method to obtain the second image set, content display attribute information of an image in the second image set being different from content display attribute information of an image in the first image set.

3. The method of claim 1, wherein the first method is different from the second method, and processing the second display signal in the second method to obtain the second image set further includes:
in response to the second display signal being a signal determined by the data apparatus not according to the identification information, and content display attribute information of the second display signal being same as content display attribute information of the first display signal, processing the second display signal in the second method to obtain the second image set, content display attribute information of an image in the second image set being same as or different from content display attribute information of an image in the first image set.

4. The method of claim 1, wherein the first method is different from the second method, and processing the second display signal in the second method to obtain the second image set further includes:
in response to the attitude information indicating the attitude of the display apparatus satisfying a third condition, and content display attribute information of the second display signal being same as content display attribute information of the first display signal, processing the second display signal in the second method to obtain the second image set, the first method including arranging display data of a unit display signal of the first display signal according to a first sequence to obtain the first image set, the second method including arranging display data of the unit display signal of the second display signal according to a second sequence to obtain the second image set, and the first sequence being opposite to the second sequence.

5. The method of claim 1, wherein:
the sub-method is a first sub-method; and
processing the second display signal in the method different from the first sub-method to obtain the second image set includes:
   in response to the unit image satisfying a third condition, processing the second display signal in a second sub-method to obtain the second image set; and
   in response to the unit image not satisfying the third condition, processing the second display signal in a third sub-method to obtain the second image set, each of the second sub-method and the third sub-method being one sub-method of the second method.

6. The method of claim 5, wherein:
the threshold is a first threshold;
the third condition includes that a ratio of a horizontal pixel number and a vertical pixel number of the unit image is greater than a second threshold;
the second sub-method includes processing the display data of the unit display signal of the second display signal to obtain the image in the third image set, and zooming out the image in the third image set according to the apparatus display attribute information to obtain the second image set; and
the third sub-method includes restoring the second display signal to obtain the second image set.

7. A display apparatus, comprising:
an interface device, configured to obtain a display signal from a data apparatus connected to the display apparatus;
a display device, configured to output an image set corresponding to the display signal;
a detector, configured to detect attitude information indicating an attitude;
a processor, configured to:
   process a first display signal in a first method to obtain a first image set; and
   in response to the attitude information indicating the attitude of the display apparatus satisfying a change condition, process a second display signal to obtain a second image set, including:
      in response to the attitude information indicating the attitude of the display apparatus satisfying the change condition, transmitting identification information including apparatus display attribute information to the data apparatus;
      obtaining the second display signal from the data apparatus; and
      processing the second display signal in a second method to obtain the second image set, including:
         in response to the attitude information indicating the attitude of the display apparatus satisfying a first condition, and a unit image corresponding to display data of a unit display signal of the second display signal satisfying a second condition, processing the second display signal in a sub-method to obtain the second image set, including:
            in response to a predetermined edge of the unit image including fill data that is greater than a threshold, determining the unit image to satisfy the second condition, the fill data being filled when the data apparatus generates the second display signal;
            processing the second display signal in the sub-method to obtain a third image set, the sub-method including processing the display data of the unit display signal of the second display signal to obtain an image in the third image set, the image in the third image set and the unit image satisfying the first condition;
            determining a target content of the image in the third image set, the target content being not the fill data and matching a display content output by the data apparatus; and
            enlarging the target content according to the apparatus display attribute information to obtain the second image set; and
         in response to the unit image not satisfying the second condition, processing the second display signal in a method different from the sub-method to obtain the second image set, the sub-method being a sub-method of the second method;
wherein:
   the first method is different from the second method; or
   content display attribute information of the first image set is different from content display attribute information of the second image set.

8. A computer-readable storage medium storing a computer program that, when executed by a processor, causes the processor to:
obtain a first display signal from a data apparatus connected to a display apparatus;
process the first display signal in a first method to obtain a first image set and output the first image set;
detect attitude information indicating an attitude; and
in response to the attitude information indicating the attitude of the display apparatus satisfying a change condition, process a second display signal from the data apparatus to obtain a second image set and outputting the second image set, including:
   in response to the attitude information indicating the attitude of the display apparatus satisfying the change condition, transmitting identification information including apparatus display attribute information to the data apparatus;
   obtaining the second display signal from the data apparatus; and
   processing the second display signal in a second method to obtain the second image set, including:
      in response to the attitude information indicating the attitude of the display apparatus satisfying a first condition, and a unit image corresponding to display data of a unit display signal of the second display signal satisfying a second condition, processing the second display signal in a sub-method to obtain the second image set, including:
         in response to a predetermined edge of the unit image including fill data that is greater than a threshold, determining the unit image to satisfy the second condition, the fill data being filled when the data apparatus generates the second display signal;
         processing the second display signal in the sub-method to obtain a third image set, the sub-method including processing the display data of the unit display signal of the second display signal to obtain an image in the third image set, the image in the third image set and the unit image satisfying the first condition;
         determining a target content of the image in the third image set, the target content being not the fill data and matching a display content output by the data apparatus; and enlarging the target content according to the apparatus display attribute information to obtain the second image set; and in response to the unit image not satisfying the second condition, processing the second display signal in a method different from the sub-method to obtain the second image set, the sub-method being a sub-method of the second method;

wherein:

the first method is different from the second method; or content display attribute information of the first image set is different from content display attribute information of the second image set.

9. The computer-readable storage medium of claim 8, wherein the content display attribute information of the first image set is different from the content display attribute information of the second image set, and the processor is further caused to:

in response to the second display signal being a signal determined by the data apparatus according to the identification information, determine the first method as the second method; and process the second display signal in the second method to obtain the second image set, content display attribute information of an image in the second image set being different from content display attribute information of an image in the first image set.

10. The computer-readable storage medium of claim 8, wherein the first method is different from the second method, and the processor is further caused to:

in response to the second display signal being a signal determined by the data apparatus not according to the identification information, and content display attribute information of the second display signal being same as content display attribute information of the first display signal, process the second display signal in the second method to obtain the second image set, content display attribute information of an image in the second image set being same as or different from content display attribute information of an image in the first image set.

11. The computer-readable storage medium of claim 8, wherein the first method is different from the second method, and the processor is further caused to:

in response to the attitude information indicating the attitude of the display apparatus satisfying a third condition, and content display attribute information of the second display signal being same as content display attribute information of the first display signal, process the second display signal in the second method to obtain the second image set, the first method including arranging display data of a unit display signal of the first display signal according to a first sequence to obtain the first image set, the second method including arranging display data of the unit display signal of the second display signal according to a second sequence to obtain the second image set, and the first sequence being opposite to the second sequence.

12. The computer-readable storage medium of claim 8, wherein:

the sub-method is a first sub-method; and the processor is further caused to:

in response to the unit image satisfying a third condition, process the second display signal in a second sub-method to obtain the second image set; and in response to the unit image not satisfying the third condition, process the second display signal in a third sub-method to obtain the second image set, each of the second sub-method and the third sub-method being one sub-method of the second method.

13. The computer-readable storage medium of claim 12, wherein:

the threshold is a first threshold;

the third condition includes that a ratio of a horizontal pixel number and a vertical pixel number of the unit image is greater than a second threshold;

the second sub-method includes processing the display data of the unit display signal of the second display signal to obtain the image in the third image set, and zooming out the image in the third image set according to the apparatus display attribute information to obtain the second image set; and the third sub-method includes restoring the second display signal to obtain the second image set.

* * * * *